Oct. 11, 1932.   M. O. HONER   1,882,603
CORN DRILL COVERER
Filed Feb. 26, 1931   2 Sheets-Sheet 1
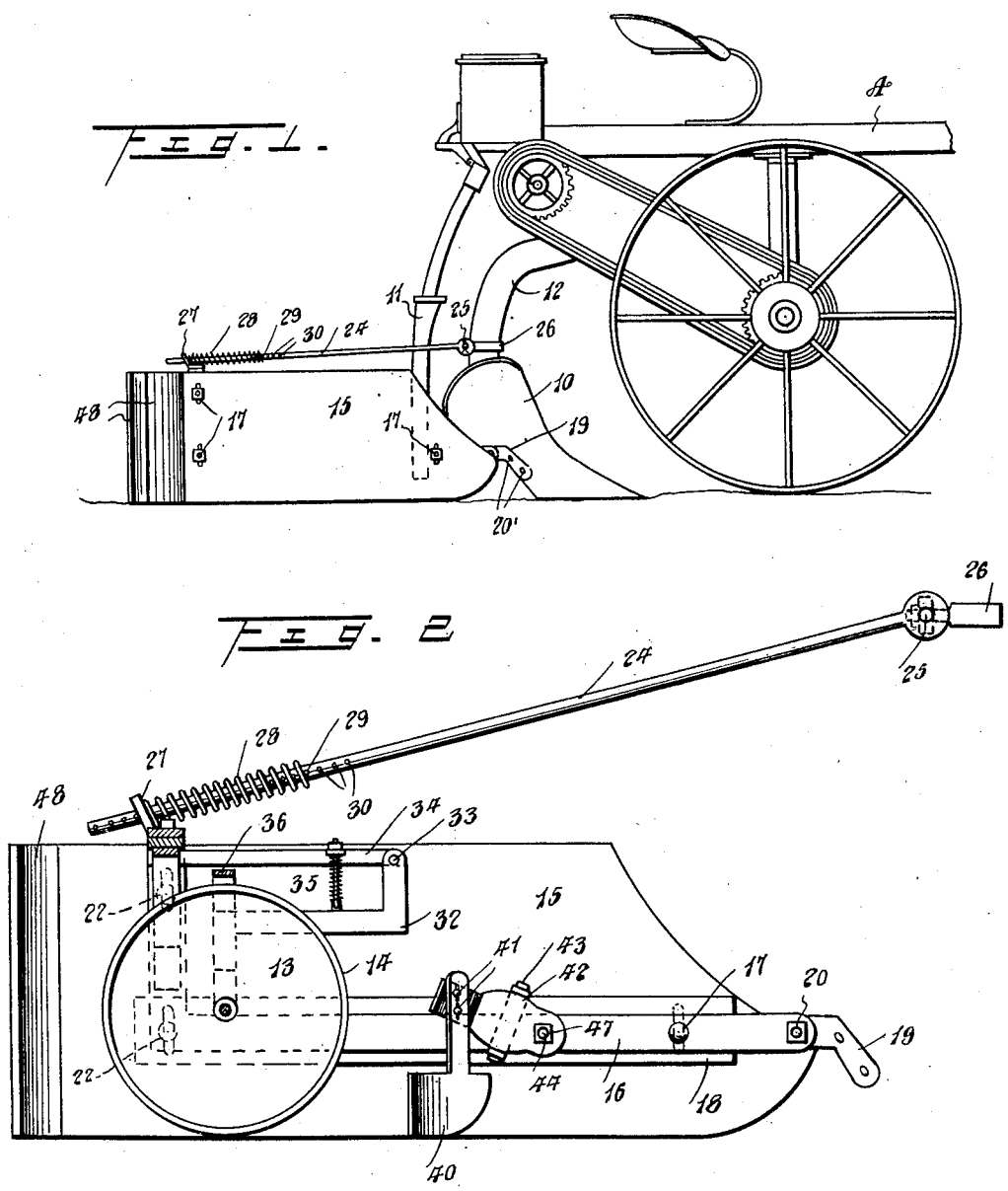
Inventor
M. O. Honer.

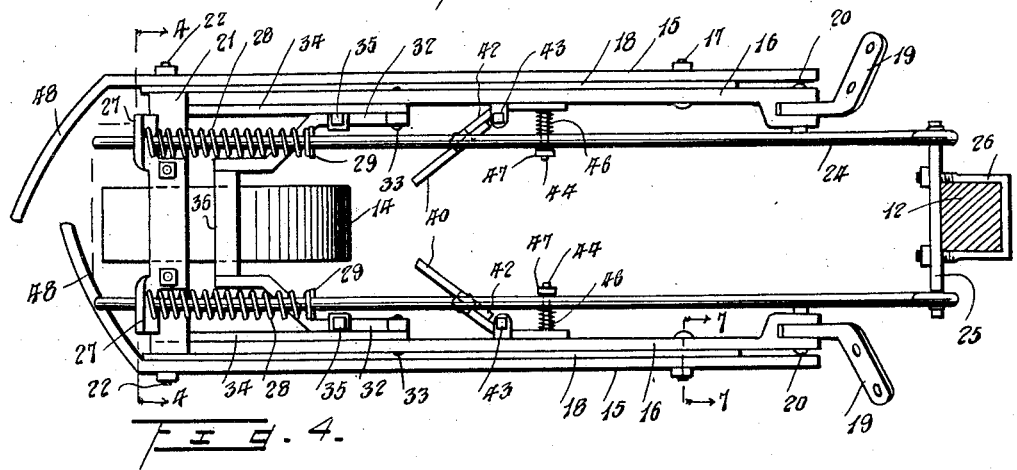
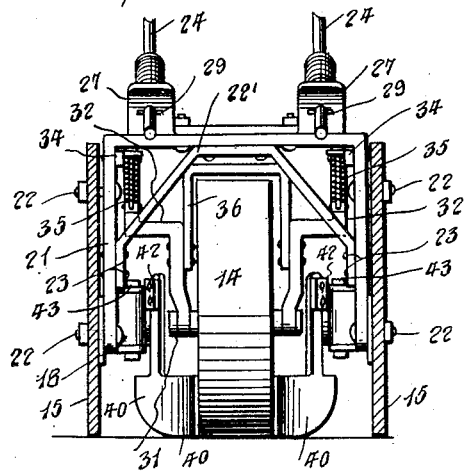
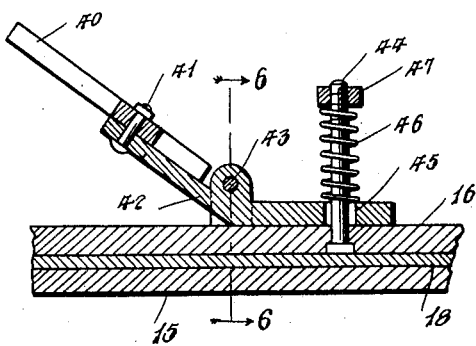
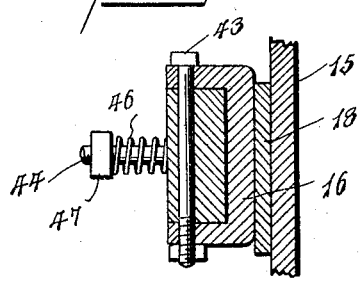
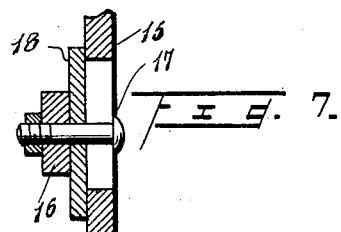

Patented Oct. 11, 1932

1,882,603

UNITED STATES PATENT OFFICE

MICHAEL O. HONER, OF WEEPING WATER, NEBRASKA

CORN DRILL COVERER

Application filed February 26, 1931. Serial No. 518,574.

This invention relates to a lister corn drill or equivalent coverer adapted to take the place of the disk and packer and having as the main object, the keeping of old weed seeds out of the row since it will prevent the weed seeds from entering the row from off of the side of the ridge.

It also aims to provide means whereby the ground which is thrown out by the subsoiler will be thrown back onto the corn after it is planted, packed, and a portion ridged up leaving a top which is not pressed.

It is further aimed to provide such a construction which will plant to an even depth, will not throw in large chunks or unpulverized earth, will work in clean soil behind the lister and leave the ridge as blind listing and without cutting the sides off.

The invention especially uses a shield on the lister which will prevent dirt and weed seeds being thrown over the top and prevent the entrance of weed seeds into the row in any manner.

Various additional objects and advantages will become apparent from a consideration of the description following taken in connection with accompanying drawings illustrating an operative embodiment.

In said drawings:—

Figure 1 is a side elevation showing the invention applied to a planter,

Figure 2 is a side elevation of the invention detached,

Figure 3 is a plan view of the invention,

Figure 4 is a cross sectional view taken on the line 4—4 of Figure 3,

Figure 5 is a horizontal detail sectional view at one of the shield connections, Figure 6 is a sectional view taken on the line 6—6 of Figure 5, and Figure 7 is a sectional view taken on the line 7—7 of Figure 3.

Referring specifically to the drawings, a lister planter of conventional form is fragmentarily shown in Figure 1 at A, 10 being the lister or subsoil plow and 11 being the seed discharge tube adapted to plant the corn or other seeds into the row open by the subsoiler 10. The beam supporting the latter is shown at 12.

In the rear of and in line with the subsoiler 10 and planter spout 11, is a press or packing wheel 13 preferably having a tire 14 of rubber so that soil will not unduly adhere thereto.

Two vertical shields or plates are disposed at the sides of the press wheel 13 extending from the subsoiler to the rear of the press wheel, thus preventing any of the soil turned by the subsoiler, from immediately returning to the row or furrow.

Said shields 15 are carried by bars 16, for vertical adjustment as at 17, plates 18 being interposed in order to cover the slots which afford the adjustment at 17.

At the forward end of the bars 16 attaching brackets 19 are pivotally connected or bolted at 20 and such brackets in turn are adapted to be bolted as at 20' to the beam 12, by the same bolts which hold the lay and mouldboard of the plow 10, together.

Said bars 16 form part of a rigid frame which is completed by an arch or U-shaped portion 21 at the rear of the attachment, which portions also have elongated slots receiving bolts 22 which adjustably connect the shields 15 in place. An arch-shaped brace 22' is located within the arch 21 and riveted or bolted thereto as at 23.

A pair of supporting rods 24 are suitably connected to the beam 12. Such rods are pivotally connected to a transverse bar 25 which is rigidly secured to the beam 12 by a U-bolt 26 or the equivalent. At the rear ends, the rods 24 are slidably mounted in brackets 27. Expansive springs 28 surround the rods 24 bearing against the brackets 27 and pins 29 applicable to various openings 30 in the rods, according to the tension desired for the springs. The springs 28 press the shields 15 and parts connected therewith against the ground or downwardly.

The press wheel 13 is journaled on an axle 31 carried by hangers 32 in the form of levers pivoted at 33 to arms 34 rigid with the arch 21. Expansive coil springs 35 arranged in abutment with the levers 32 and bars 34 serve to urge the wheel 13 into contact with the ground. The hangers 32 are connected in unitary relation by means of an arch 36.

A pair of row covering plates are employed at 40, being obliquely arranged as shown in Figure 3. The same are hinged and resiliently maintained in the position shown, so that they may yield in the event an undue obstruction is encountered, rather than break. To this end, the plates 40 are adjustably bolted as at 41 to mounting brackets 42 having arms disposed at an angle to each other and being pivotally connected as at 43, on vertical axes, to the bars 16. The brackets 42 are also obliquely disposed as shown in Figure 2 and have bolts 44, secured to the bars 16, passing through enlarged slots 45 thereof. Relatively strong expansive springs 46 are coiled about the bolts 44 and bear against the brackets 42 and nuts or abutments 47 on the bolts.

It will be noted that the rear ends of the shields 15 extend inwardly as at 48, meeting on the longitudinal median line of the device but having their terminals spaced apart.

As a result of the construction described, the soil which is turned by the plow 10 is prevented from immediately returning to the row or furrow by the shields 15. There is sufficient dirt within the same however for the blades or plates 40 to partially fill the furrow over corn or other seed dropped through the spout 11. Such dirt is engaged by the wheel 13, after which through the advance or forward movement of the device, the soil held back by the shields 15 is permitted to fall over the furrow forming a ridge, which is loose and pulverized. In this manner, the portion of the soil bearing the weed seeds is prevented from being planted in the furrow close to the corn, which has a very beneficial effect in obtaining much larger crops in the same planted area.

It will be realized that all of the parts of the attachment are connected to the beam 12 or the same and the subsoiler as a unit and hence the attachment may be raised and lowered with the beam 12 and subsoiler by the usual mechanism provided for the latter.

Various changes may be resorted to provided they fall within the spirit and scope of the invention.

I claim as my invention:—

1. An attachment for a lister and coacting planter spout comprising a presser, shields about said presser to prevent plowed soil from returning to the furrow, a frame mounting the shields, means mounting said presser from the frame, blades in advance of the presser for moving adjacent soil into the furrow after planting, and spring pressed means yieldably mounting the plates.

2. An attachment for a lister and coacting planter spout comprising a presser, shields about said presser to prevent plowed soil from returning to the furrow, a frame mounting the shields, means mounting said presser from the frame, blades in advance of the presser for moving adjacent soil into the furrow after planting, and spring pressed means yieldably mounting the plates, comprising brackets having arms at an angle to each other, means pivotally mounting the brackets adjacent the junction of the arms, bolts extending through one of the arms, expansive springs surrounding the bolts and engaging the latter arms, said plates being disposed at an angle.

3. An attachment for a lister and coacting planter spout comprising a presser, shields about said presser to prevent plowed soil from returning to the furrow, a frame mounting the shields, means mounting said presser from the frame, means to connect the shields to a lister beam, means also adapted for connection to a lister beam, and expansive spring means on the latter means abutting the same and the frame.

4. In combination with a lister beam, lister thereon, and coacting planting means, a frame connected to said beam, said frame having side members, shields connected to the side members having inturned rear ends, furrow covering plates in the rear of the planting means secured to said side members, arms extending from the frame, hangers pivoted to the arms, a packer wheel carried by said arms in the rear of said plates, rods above the side members pivotally connected to said beam, means on the frame engaged by the rods, and expansive springs on the rods engaging the latter means.

In testimony whereof I affix my signature.

MICHAEL O. HONER.